Feb. 3, 1931.  C. H. HAPGOOD  1,790,858
WEIGHING AND COUNTING SCALE
Filed Jan. 26, 1920   2 Sheets-Sheet 1

Inventor
Clarence H. Hapgood.
By George R. Frye.
Attorney

Feb. 3, 1931.  C. H. HAPGOOD  1,790,858
WEIGHING AND COUNTING SCALE
Filed Jan. 26, 1920  2 Sheets-Sheet 2
Fig. 2.
Fig. 3.
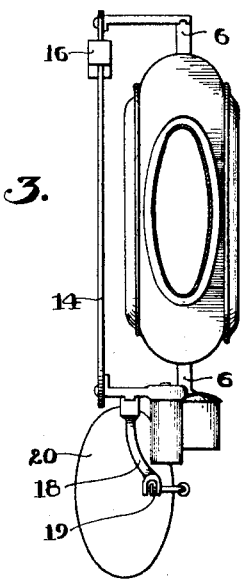
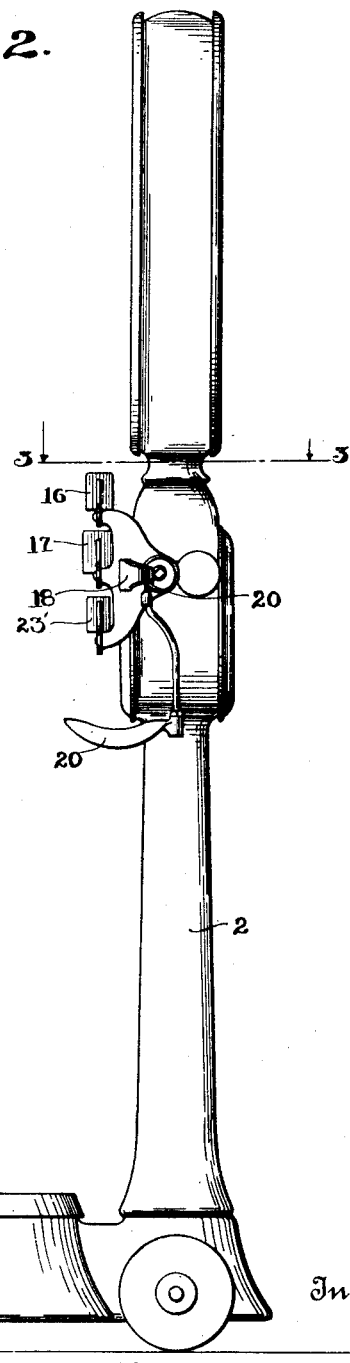
Inventor
Clarence H. Hapgood.
By George R. Frye.
Attorney Patented Feb. 3, 1931

1,790,858

UNITED STATES PATENT OFFICE

CLARENCE H. HAPGOOD, OF TOLEDO, OHIO, ASSIGNOR TO TOLEDO SCALE MANUFACTURING COMPANY, OF TOLEDO, OHIO, A CORPORATION OF NEW JERSEY

WEIGHING AND COUNTING SCALE

Application filed January 26, 1920. Serial No. 354,051.

This invention relates to scales, and has for one of its principal objects the provision of a scale which may be converted at will from an automatic weighing scale to a counting scale.

Another object is the provision of a scale which may be used to ascertain the total weight, as well as the total number, of a lot of articles of uniform weight.

Other objects and advantages will be apparent from the following description, in which reference is had to the accompanying drawings illustrating a preferred embodiment of my invention and wherein similar reference numerals designate similar parts throughout the several views.

In the drawings:—

Figure 2 is a side elevation thereof; and

Figure 3 is a sectional plan taken substantially on the line 3—3 of Figure 2.

Figure 1:
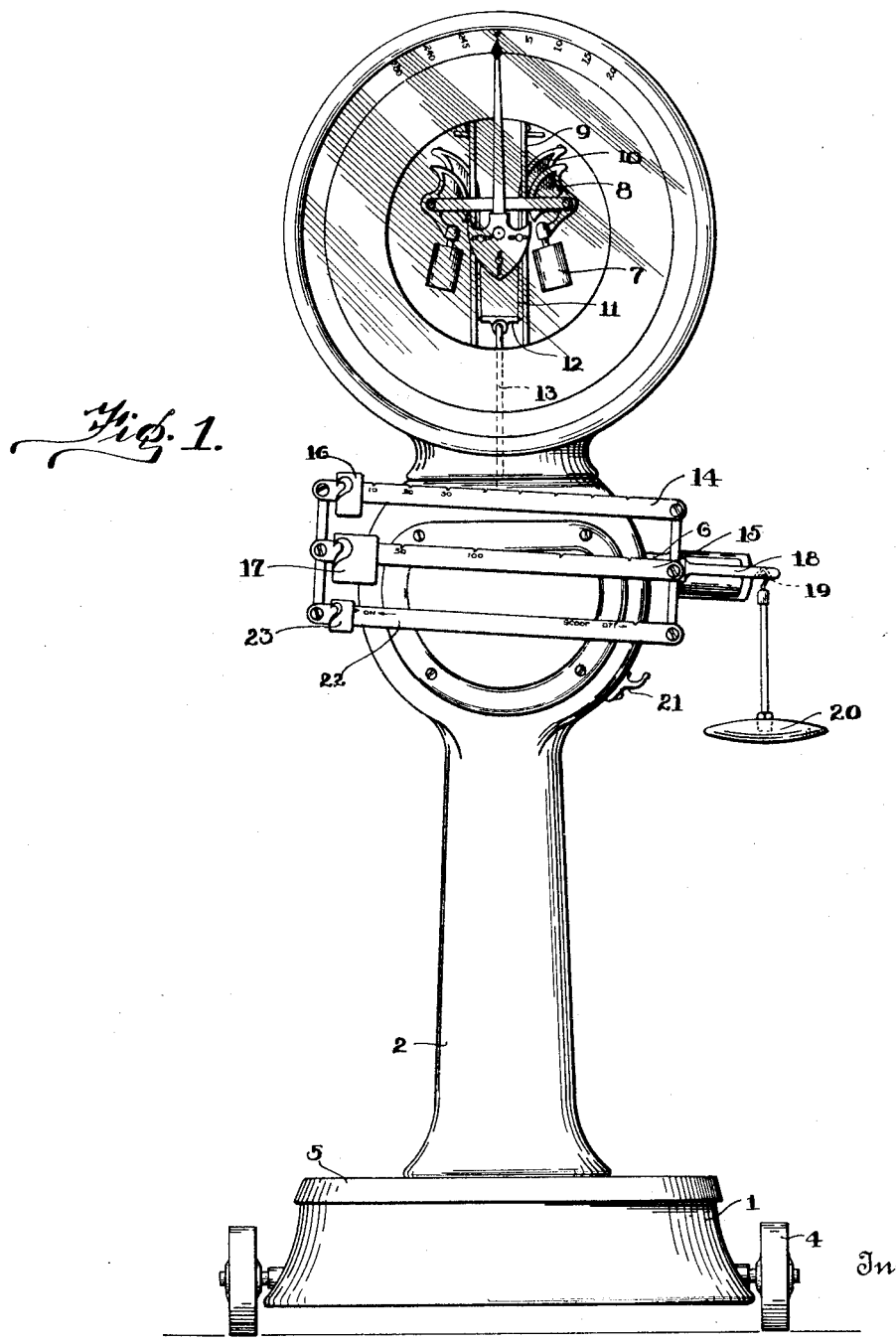
Figure 1 is a front elevation of a scale embodying my invention.

I have shown my invention as applied to an automatic scale of the pendulum type, such as is shown and described in my co-pending application Ser. No. 256,176, filed September 30, 1918, but it is to be understood that the invention is also adapted for use with other types of scales and that I contemplate its use wherever applicable.

The frame of the scale comprises a base housing 1 at the forward end of which is supported a column 2 having a substantially watch-casing shaped head carried upon its upper end. In order that the scale may be easily moved about, the base housing is provided with wheels. The platform 5 of the scale is positioned above the base housing 1 and is carried by platform levers (not shown) which are enclosed in the base housing and are suitably connected by means of a steelyard which passes upwardly through the column 2 with the tare beam lever 6.

The automatic weighing mechanism comprises a pair of oppositely-swinging pendulums 7 which are rigid with fulcrum sectors 8 supported upon flexible steel bands or ribbons which are connected to upright members 9 of the frame supported in the head 3. The pendulums 7 are also provided with power sectors 10 to which are attached flexible bands or ribbons 11 that extend downwardly and are secured to an equalizer 12 which in turn is connected to a hook rod 13 that extends downwardly to the tare beam lever 6. Since my invention does not reside in the weighing mechanism per se of the scale, I have illustrated and described it and will delineate its operation only in such detail as will suffice to clearly show its co-operation in the combination which forms the counting scale of my invention. The connections from the platform lever to the load-counterbalancing mechanism are substantially the same as those illustrated and described in my United States Patent No. 1,402,764, dated January 10, 1922. When a lot of articles or other commodity is placed upon the scale platform the tare beam lever 6 is rocked upon its fulcrum, pulling downwardly upon the hook rod 13 and ribbons 11 and thereby causing the pendulums 7 to swing outwardly and upwardly until the load on the scale platform is counterbalanced.

The tare beam lever is equipped with tare beams 14 and 15, upon which are mounted sliding poises 16 and 17 that may be moved along the beams to take out tare or to increase the capacity of the scale. In order to adapt the scale for counting, the tare beam lever 6 is provided with an extension 18, the free end of which supports a pivot 19 adapted to support a ratio pan 20. When the ratio pan is not in use it may be hung upon the bracket 21 secured upon the side of the column 2. In addition to the usual tare and capacity beams 14 and 15, the tare beam lever is provided with a third beam 22 having a poise 23 mounted thereon. The poise 23 is used to counterbalance the weight of the ratio pan 20 when supported on the pivot 19, and in the illustrated embodiment the poise offset such weight when it is substantially in the position shown at the left end of the beam 22. When the ratio pan is removed from the tare beam lever the poise 23 is moved to the right end of the beam 22 and the scale is thereby brought to balance at zero.

The multiplication of the lever mechanism from the load pivot of the platform levers to the pivot 19 which supports the ratio pan may be varied to suit conditions, but preferably some convenient ratio, such as 25:1, 50:1, or 100:1, is chosen. Taking the ratio as 50:1, when it is desired to count out a certain number of articles of substantially uniform weight, one of the articles is placed in the ratio pan for every fifty in the number to be counted. If, for example, three of the articles are placed in the ratio pan, they will be balanced by one hundred and fifty on the scale platform. To find the weight and number of articles in a given lot, the lot is placed upon the scale platform and the weight is immediately automatically indicated on the dial. Enough of the articles are then removed from the platform and placed in the ratio pan to bring the indicator hand back to zero. The number of articles in the ratio pan multiplied by fifty gives the number of articles on the scale platform, and the total is, of course, the number on the platform plus the number in the ratio pan. Should it be impossible to bring the indicator hand to exact zero by transferring articles from the platform to the ratio pan, the hand is brought as nearly to zero as possible by this means and is then brought to exact zero by removing additional articles from the platform without placing them in the ratio pan. The articles so removed are counted and the number added to the number on the platform and the number in the pan to find the total in the lot.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a counting scale, in combination, a chart, an indicator co-operating therewith, a beam lever connected to said indicator, a removable ratio pan supported on said beam lever, and means on said beam lever for balancing the scale when said ratio pan is removed.

2. In a counting scale, in combination, a chart, an indicator co-operating therewith, a beam lever connected to said indicator, a removable ratio pan supported on said beam lever, and a slidable poise carried by said beam lever for balancing the scale when said ratio pan is removed.

3. In a device of the class described, in combination, a dial, an indicator co-operating therewith, means for operating said indicator, a commodity-receiver, means connecting said commodity-receiver to said indicator operating mechanism, a lever connected to said commodity-receiver, a beam on said lever, a poise on said beam, and a ratio pan connected to said lever, the parts being so constructed and arranged that when the load on said commodity-receiver is counterbalanced by a load on said ratio pan said indicator is brought into registration with a predetermined mark on said dial.

4. A combined weighing and counting scale comprising, in combination, a commodity-receiver, automatic weighing and indicating mechanisms, means connecting said automatic weighing and indicating mechanisms to said commodity-receiver, the construction of such connecting means being such that a slight movement of said commodity-receiver is necessary for capacity movement of said automatic weighing and indicating mechanisms, a ratio pan adapted to receive specimens of a commodity to be counted, and motion multiplying mechanism connecting said ratio pan to said commodity-receiver to act in opposition thereto, the leverage of said motion multiplying mechanism being such as to cause movement of said ratio pan relative to said commodity-receiver in a ratio of at least 20:1, the parts being so constructed and arranged that said indicating mechanism is brought to a predetermined point when said commodity-receiver and said ratio pan are empty or when the load on one counterbalances the load on the other.

5. In a device of the class described, in combination, lever mechanism, a commodity-receiver supported thereby, load-counterbalancing and indicating mechanisms so connected to said lever mechanism that a slight movement of said commodity-receiver is necessary for capacity movement of said load-counterbalancing and indicating mechanisms, the arrangement being such that the weight of a load placed on said commodity-receiver is automatically counterbalanced by said load-counterbalancing mechanism and indicated by said indicating mechanism, a ratio pan adapted to receive specimens of a commodity to be counted, and means connecting said ratio pan to said lever mechanism to act in opposition to said commodity-receiver whereby said indicating mechanism is brought to a predetermined position when a load on said commodity-receiver is counterbalanced by a load in said ratio pan having a small fraction of the weight of the load on said commodity-receiver.

6. In a device of the class described, in combination, lever mechanism, a commodity-receiver supported thereby, load-counterbalancing and indicating mechanisms so connected to said lever mechanism that a slight movement of said commodity-receiver is necessary for capacity movement of said load-counterbalancing and indicating mechanisms, the arrangement being such that the weight of a load placed on said commodity-receiver is automatically counterbalanced by said load-counterbalancing mechanism and indicated by said indicating mechanism, a ratio pan adapted to receive specimens of a commodity to be counted, and means connecting said ratio pan to said lever mechanism to act in opposition to said commodity-receiver whereby said indicating mechanism is brought to a predetermined position when a load on said commodity-receiver is counterbalanced by a load in said ratio pan having a definite fraction of the weight of the load on said commodity-receiver, the relative leverages of the ratio pan and commodity-receiver being such that the said fraction is less than one-twentieth.

7. In a device of the class described, in combination, lever mechanism, a commodity-receiver supported thereby, a ratio pan adapted to receive specimens of a commodity to be counted connected to said lever mechanism to act in opposition to said commodity-receiver, the leverage of said ratio pan being a fixed multiple of the leverage of said commodity-receiver, said multiple being greater than twenty, a dial, an indicator co-operating with said dial, and means connecting said indicator to said lever mechanism whereby said indicator is moved to full capacity position by a slight movement of said commodity-receiver and is caused to register with a predetermined mark on said dial when a load on said commodity-receiver is counterbalanced by a load in said ratio pan having a predetermined fraction less than one-twentieth of the weight of the load on said commodity-receiver.

CLARENCE H. HAPGOOD.